(12) United States Patent
Jaehnisch et al.

(10) Patent No.: US 10,424,081 B2
(45) Date of Patent: Sep. 24, 2019

(54) METHOD AND APPARATUS FOR CALIBRATING A CAMERA SYSTEM OF A MOTOR VEHICLE

(71) Applicant: Volkswagen Aktiengesellschaft, Wolfsburg (DE)

(72) Inventors: Marco Jaehnisch, Berlin (DE); Manuel Siebeneicher, Berlin (DE); Alexander Fietz, Berlin (DE); Andreas Haja, Oldenburg (DE); Daniel Liebehenschel, Berlin (DE); Christoph Soehnel, Berlin (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 136 days.

(21) Appl. No.: 15/350,406

(22) Filed: Nov. 14, 2016

(65) Prior Publication Data

US 2017/0061623 A1 Mar. 2, 2017

Related U.S. Application Data

(63) Continuation of application No. PCT/EP2015/059991, filed on May 6, 2015.

(30) Foreign Application Priority Data

May 14, 2014 (DE) .......................... 10 2014 209 137

(51) Int. Cl.
*G06T 7/00* (2017.01)
*G06T 7/80* (2017.01)
(Continued)

(52) U.S. Cl.
CPC .................. *G06T 7/80* (2017.01); *G06T 7/20* (2013.01); *G06T 7/73* (2017.01);
(Continued)

(58) Field of Classification Search
CPC .... G06T 7/20; G06T 7/80; G06T 7/73; G06T 2207/10016; G06T 2207/30244; G06T 2207/30248
(Continued)

(56) References Cited

U.S. PATENT DOCUMENTS 4,933,864 A * 6/1990 Evans, Jr. ................. G01S 5/16
180/167
5,051,906 A * 9/1991 Evans, Jr. ................. G01S 5/16
180/169
(Continued)

FOREIGN PATENT DOCUMENTS

DE 10 2004 001 572 A1 8/2005
DE 103 05 993 B4 1/2006
(Continued)

OTHER PUBLICATIONS

Tapia et al., "A Note on Calibration of Video Cameras for Autonomous Vehicles with Optical Flow," Free Univ. of Berlin, at http://www.mi.fu-berlin.de/inf/groups/ag-ku/publicatons/G-13-02/TR-Ernesto.pdf, pp. 1-4 (Feb. 2013).
(Continued)

*Primary Examiner* — Zaihan Jiang
(74) *Attorney, Agent, or Firm* — Muncy, Geissler, Olds & Lowe, P.C.

(57) ABSTRACT

In a method and an apparatus for calibrating a camera system of a motor vehicle, the calibration parameters comprising the rotation angle, pitch angle, yaw angle and roll angle as well as the height of the camera above the road, the rotation angle is determined from the ascertainment of the vanishing point from a first optical flow between a first and a second successive camera image, and the height of the camera is determined from a second optical flow between a first and a second, successive camera image. To determine the first optical flow, a regular grid is placed over the first
(Continued)

camera image, correspondences of the regular grid are searched for in the second camera image, and the first optical flow is determined from the movement of the grid over the camera images.

12 Claims, 3 Drawing Sheets

(51) Int. Cl.
    *G06T 7/20*     (2017.01)
    *G06T 7/73*     (2017.01)

(52) U.S. Cl.
    CPC .............. *G06T 2207/10016* (2013.01); *G06T 2207/30244* (2013.01); *G06T 2207/30248* (2013.01)

(58) Field of Classification Search
    USPC ......................................................... 348/148
    See application file for complete search history.

(56) References Cited

U.S. PATENT DOCUMENTS

| | | | | |
|---|---|---|---|---|
| 5,521,633 | A * | 5/1996 | Nakajima | B60Q 9/008 348/118 |
| 6,535,114 | B1 * | 3/2003 | Suzuki | G06T 7/20 340/435 |
| 8,237,794 | B2 | 8/2012 | Moritz et al. | |
| 9,262,828 | B2 | 2/2016 | Pflug et al. | |
| 2005/0237385 | A1 | 10/2005 | Kosaka et al. | |
| 2009/0243889 | A1 * | 10/2009 | Suhr | G06K 9/00812 340/932.2 |
| 2009/0290032 | A1 * | 11/2009 | Zhang | B60R 1/00 348/211.9 |
| 2011/0206236 | A1 * | 8/2011 | Center, Jr. | G06T 7/579 382/103 |
| 2013/0235347 | A1 * | 9/2013 | Hennessey | G06F 3/013 351/210 |
| 2014/0253722 | A1 * | 9/2014 | Smyth | G01P 3/38 348/135 |
| 2015/0161456 | A1 * | 6/2015 | Chevalley | G01B 11/00 348/148 |

FOREIGN PATENT DOCUMENTS

| | | |
|---|---|---|
| DE | 10 2004 048 400 A1 | 4/2006 |
| DE | 10 2005 001 429 A1 | 7/2006 |
| DE | 10 2008 008 619 A1 | 7/2008 |
| EP | 2 131 598 A2 | 12/2009 |
| EP | 2 618 305 A1 | 7/2013 |
| JP | 2003-329411 A | 11/2003 |
| WO | WO2012139636 A1 * | 4/2011 |
| WO | WO-2012145818 A1 * | 1/2012 |
| WO | WO 2012145818 A1 * | 1/2012 |
| WO | WO2012139636 A1 * | 4/2012 |
| WO | WO2012145818 A1 | 11/2012 |
| WO | WO2013169185 A1 * | 5/2013 |

OTHER PUBLICATIONS

Rodriguez-Canosa et al., "A Real-Time Method to Detect and Track Moving Objects (DATMO) from Unmanned Aerial Vehicles (UAVs) Using a Single Camera," Remote Sensing, vol. 4, No. 12, pp. 1090-1111 (Apr. 20, 2012).
Kitt et al., "Block-Matching based Optical Flow Estimation with Reduced Search Space based on Geometric Constraints," $20^{th}$ Ann. IEEE Conf. on Intelligent Trans. Sys. (ITSC), pp. 1104-1109 (Sep. 19, 2010).
Manuel Siebeneicher, "Eine automatische Kalibrierung beliebiger Kameras in Fahrzeugen auf Grundlage von Optischem Fluss and Fluchtpunktbestimmung" (Automatic Calibration of an Arbitrary Camera in Vehicles based on Optical Flow and Vanishing Point Determination. Master's Thesis. Freie Univ. Berlin. pp. 1-72 (2008).
Marita et al., "Camera Calibration Method for Far Range Stereovision Sensors Used in Vehicles," IEEE Symp. on Intelligent Vehs., pp. 356-363 (2006).
Zhang et al., "A robust technique for matching two uncalibrated images through the recovery of the unknown epipolar geometry," Art. Intelligence, vol. 78, pp. 87-119 (1995).
Zhaoxue et al., "Efficient method for camera calibration in traffice scenes," Elec. Letts., vol. 40, No. 6, pp. 368-369 (2004).
Platonov et al., "Vollautomatische Kamera-zu-Fahrzeug-Kalibrierung," (Fully Automatic Camera-to-Vehicle Calibration), ATZ Elektronik, pp. 120-123 (2012).
Second Office Action from Chinese Patent Office dated Feb. 19, 2019 in corresponding application 201580025056.5.

* cited by examiner

METHOD AND APPARATUS FOR CALIBRATING A CAMERA SYSTEM OF A MOTOR VEHICLE

This nonprovisional application is a continuation of International Application No. PCT/EP2015/059991, which was filed on May 6, 2015, and which claims priority to German Patent Application No. 10 2014 209 137.3, which was filed in Germany on May 14, 2014, and which are both herein incorporated by reference.

BACKGROUND OF THE INVENTION

Field of the Invention

The invention relates to a method for calibrating a camera system of a motor vehicle as well as to a corresponding apparatus.

Description of the Background Art

Today's motor vehicles having driver assistance systems are equipped with a large number of sensors, many driver assistance systems depending on the data of cameras. To ensure a reliable operation of the driver assistance system, these cameras must be calibrated. According to the prior art, a complex, static calibration is carried out in the factory for this purpose. To eliminate the static calibration, a robust online calibration system is needed, which provides suitable calibration results after a short driving distance, such as the three orientation angles of the camera and its height above the ground.

In M. Siebeneicher: "Eine automatische Kalibrierung beliebiger Kameras in Fahrzeugen auf Grundlage von optischem Fluss and Fluchtpunktbestimmung" (Automatic Calibration of an Arbitrary Camera in Vehicles Based on Optical Flow and Vanishing Point Determination), Master's Thesis, Freie Universität Berlin 2008, a method is explained, which determines the orientation angle of the camera by evaluating the optical flow based on the movement of concise feature points and ascertaining the vanishing point of the optical flow. To ascertain the vanishing point, the movement vectors of the feature points are intersected with each other, wherein the points of intersection should theoretically coincide with the vanishing point, which, however, is only approximately the case, due to measuring inaccuracies, so that the maximum of all points of intersection are taken as the vanishing point. To reduce measuring inaccuracies, the points of intersection are followed over time with the aid of a particle filter, and the vanishing points resulting therefrom image-wise are stabilized with the aid of a RANSAC filtering.

The time profile of the vanishing point is evaluated to determine the roll angle from the horizon. Once a certain number of vanishing points in left and right turn maneuvers have been ascertained, the horizon is determined from a subset of all vanishing points calculated up to that time by analyzing the main components. By comparing the velocity changes and the yaw angle, it is ascertained whether the vehicle is moving uniformly in a straight trajectory, and the pitch and yaw angles may therefore be determined, or whether a turn maneuver is being carried out. In this method, the height is determined separately. However, the system is computationally very complex, in particular due to the determination of features and the complex filtering of the vanishing point.

The method presented in J. Platonov et al: "Vollautomatische Kamera-zu-Fahrzeug-Kalibrierung" (Fully Automatic Camera-to-Vehicle Calibration), ATZ elektronik 2012, pp. 120-123, describes a technique for the purely image-based determination of the camera orientation without determining the camera height. The method is based on the technique of visual movement estimation. The first method determines the vehicle movement between two adjacent images, and a second method examines the point correspondence between six images, the second method being more accurate but also much more computationally complex. To determine the orientation angle, the camera movement is divided into the classes of "straight movement" and "maneuver." The pitch and yaw angles are estimated during the straight movement and the roll angle during the maneuver.

A method is presented in E. Tapia et al: "A Note on Calibration of Video Cameras for Autonomous Vehicles with Optical Flow," Department of Mathematics and Computer Science, Serie B Informatik (Series B Computer Science), Freie Universität Berlin, February 2013, which determines the orientation of the camera only on the basis of camera images and determines the camera height with the aid of the vehicle velocity. The optical flow is determined in a manner which is not described in greater detail, and it is demonstrated that the flow vectors intersect at the vanishing point when driving in a straight trajectory. The ground plane is ascertained to determine the horizon, the three Euler angles being able to be determined with the aid of the vanishing point and the horizon. To determine the camera height, the vehicle travels forward, the camera orientation being known, and the camera being directed onto the road so that the road is displayed in the camera image. The start and end points of a flow vector in the image are projected back into the world coordinate system. The camera height may be calculated with the aid of this information, taking into account the vehicle velocity as well as the driving duration.

Publication EP 2 131 598 A2 relates to a stereo camera system as well as a method for ascertaining at least one calibration error of a stereo camera system. With the aid of at least two individual cameras of the stereo camera system, an image sequence of images having depictions of a detection area in front of a vehicle is recorded during a travel of a vehicle along a road. Corresponding image data is generated from the images of the image sequences. The generated image data is processed, the course of at least one edge of the road being ascertained. At least one calibration error is ascertained on the basis of the ascertained course of the at least one edge of the road.

To determine the position of all three angles of the camera orientation as well as the height of the camera above ground, the known systems are computationally intensive and often insufficiently accurate, in particular in poor weather conditions as well as over short driving distances having few turn maneuvers.

SUMMARY OF THE INVENTION

It is therefore an object of the invention to provide a method and an apparatus for calibrating a camera system of a motor vehicle which permits a faster calibration of the camera system.

In an exemplary embodiment according to the invention, for calibrating a camera system of a motor vehicle, the calibration parameters comprising the rotation angle, pitch angle, yaw angle and roll angle as well as the height of the camera above the road, the rotation angle is determined from the ascertainment of the vanishing point from a first optical flow between a first and a second camera image, and the height of the camera is determined from a second optical flow between a first and a second, successive camera image. To determine the first optical flow, a regular grid is placed over the first camera image, correspondences of the regular grid are searched for in the second camera image, and the first optical flow is determined from the movement of the grid over the camera images.

The optical flow between two images is thus determined by placing a regular grid over the first image and searching for the grid points of this grid in the second image, for example with the aid of the Lucas-Kanade method.

The distances between the grid points can be parameterizable. A scalability of the calculation of the optical flow may be achieved in this manner. The shorter the distance between the grid points, the longer the calculation duration, while a more accurate vanishing point estimate results in this manner.

The epipoles in both camera images are calculated on the basis of the ascertained first optical flow, and the epipoles form the basis of the vanishing point estimate. The epipoles may be ascertained by calculating the fundamental matrix based on the optical flow.

To determine the pitch angle and the yaw angle, the vanishing point can be determined from the two epipoles of the two camera images when the distance between the epipoles is situated within a first predefined interval. The pitch angle and the yaw angle can be determined during a straight driving trajectory, so that the two epipoles are situated close together. For example, the mean value, which is then incorporated into the estimate of the pitch and yaw angles as the instantaneous vanishing point, is formed from the two epipoles.

The ascertained vanishing points can be stored over time, and a time-stable vanishing point can be ascertained from the quantity of the ascertained vanishing points for the purpose of determining the pitch angle and the yaw angle. A storage interval may be predefined which moves with the instantaneous time. Old vanishing points may be discarded in this manner. The number of ascertained vanishing points needed to estimate the time-stable vanishing point may furthermore be defined by means of the storage interval.

The ascertained epipoles of two camera images can also be used to determine the roll angle when the distance between the epipoles is situated within a second, predefined interval, a roll angle being estimated from the position of the epipoles in the particular camera image. In other words, if the two epipoles are situated "far" apart, the vehicle is in a turn maneuver, and an instantaneous roll angle may be determined. The two predefined intervals are disjoint to distinguish the rotation angles for which the instantaneous epipoles are being used.

The ascertained roll angles are collected over time and divided into predefined groups as a function of the yaw rate of the motor vehicle. The expiration time as well as the number and definition of the groups are preferably parameterizable.

A mean group roll angle can be formed for each roll angle stored in the predefined group when the number of measurements in each group has reached a minimum quantity. The final roll angle used for calibration may be formed, for example as the average of the mean group roll angles over the groups.

To determine the second optical flow in a section of a first image of the road, a rectangle is placed in front of the vehicle in a top view, whose position is ascertained in the second image, the second optical flow being formed by the movement of the rectangle in the two images and the height of the camera being calculated from the movement of the rectangle. A highly simplified, second optical flow is determined in this manner, it being possible to locate the rectangle in the second image with the aid of block matching, so that the movement of the rectangle, and thus the second optical flow, may be determined. The rectangle is parameterizable with the parameters of the height and width of the rectangle.

A time histogram of the ascertained heights of the camera can also be generated for a large number of first and second camera images, and an estimated height is derived from the histogram upon reaching a minimum number of measurements. The use of a histogram improves the height estimate, since the ascertained movement of the rectangle is underlaid with noise.

The apparatus according to the invention for calibrating a camera system of a motor vehicle, which is configured and designed to carry out the method explained above, comprises: a device for determining a first optical flow between a first and a second successive camera image; a device for determining vanishing points from the first optical flow; a device for determining the rotation angle from ascertained vanishing points; a device for determining a second optical flow between a first and a second successive camera image; and a device for determining the height of the camera from a second optical flow; wherein to determine the first optical flow, a regular grid is placed over the first camera image, correspondences of the regular grid are searched for in the second camera image, and the first optical flow is determined from the movement of the grid over the camera images.

The device for determining the vanishing point also preferably calculates the epipoles in the two camera images on the basis of the ascertained first optical flow and uses the epipoles to estimate the vanishing point.

To determine the second optical flow in a section of a first image of the road, a rectangle is placed in front of the vehicle in a top view and ascertained in the second image, the second optical flow being formed by the movement of the rectangle in the two images, and the height of the camera is calculated from the movement of the rectangle.

The device for determining the camera height furthermore can generate a time histogram of the measured heights of the camera for a large number of first and second camera images and derives an estimated height from the histogram upon reaching a minimum number of measurements.

The method according to the invention and the corresponding device are advantageously able to robustly determine the yaw and pitch angles after a short distance while driving in a straight trajectory as well as the roll angle after a short driving distance with at least one left turn and one right turn. The camera height above ground is furthermore determined parallel thereto, so that the camera is calibrated within a significantly shorter convergence time. No dependencies on predefined markings, structures or shapes exist; in other words, the described method and the device work in any surroundings. The surroundings should have only a modicum of structure which is detectable by the camera and also permit at least one steering maneuver of the vehicle.

Moreover, no complex feature extraction is carried out, and the explained approach is structured in such a way that it may be implemented in a manner suitable for control units.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
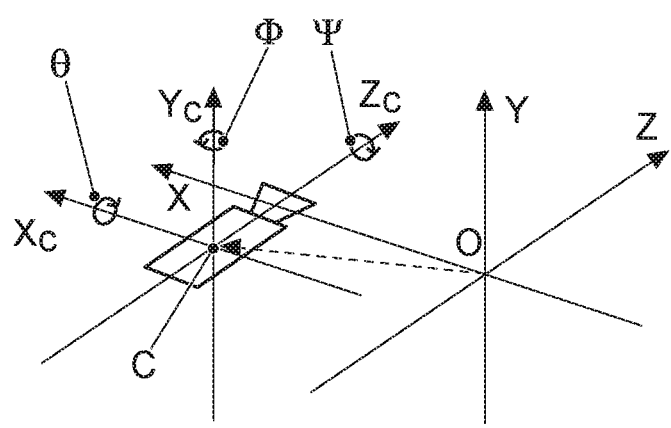
FIG. 1 shows coordinate systems for defining extrinsic camera parameters.

FIG. 1 shows world coordinate system (O, X, Y, Z), which has zero point O and spatial axes X, Y and Z, in which the motor vehicle moves, and also coordinate system (C, $X_C$, $Y_C$, $Z_C$) of camera K, which is illustrated schematically in FIG. 1 and has zero point C and axes $X_C$, $Y_C$ and $Z_C$. Camera coordinate system (C, $X_C$, $Y_C$, $Z_C$) may be shifted with respect to world coordinate system (O, X, Y, Z) of the motor vehicle and rotated around three axes $X_C$, $Y_C$ and $Z_C$. The possible rotation angles are illustrated in FIG. 1 as pitch angle θ, yaw angle φ and roll angle ψ. As mentioned above, the parameters of height of the camera above the road, pitch angle θ, yaw angle φ and roll angle ψ should be determined to calibrate the camera of a motor vehicle.

World coordinate system (O, X, Y, Z) and camera coordinate system (C, $X_C$, $Y_C$, $Z_C$) may differ from each other in terms of position and orientation. The difference in orientation is indicated by a rotation around the particular axis, camera K being able to be rotated around three axes $X_C$, $Y_C$, $Z_C$, and each rotation being able to be described by a corresponding rotation matrix $R_{Pitch}$, $R_{Yaw}$ and $R_{Roll}$ in the usual manner. Complete rotation matrix R is a composition of the individual rotation matrices and is formed as follows:

$$R = R_{Roll} R_{Pitch} R_{Yaw}$$

and corresponds to a rotation around the Y axis, followed by a rotation around the X axis and finally around the Z axis.

Together with translation vector $C = (C_x, C_y, C_z)^T$, which describes the zero point of the camera coordinate system in the world coordinate system and indicates the difference in the positions of the two coordinate systems, a uniform transformation matrix may be formed which converts the world coordinate system into the camera coordinate system.

With the aid of the vanishing point, yaw angle θ and pitch angle φ may be determined from complete rotation matrix R in a straight-line movement, since roll angle ψ is zero in a straight-line movement. A vanishing point is not sufficient to determine roll angle ψ, although roll angle ψ may be determined from the course of the vanishing point during a turn maneuver, since the vanishing point changes its position in proportion to roll angle ψ. Details on the theoretical bases may be found, for example, in the aforementioned Master's thesis by M. Siebeneicher.

The determination of the orientation or rotation angle therefore presupposes a preferably accurate determination of the vanishing points used and their movement, whose determination, in turn, depends on an optimum determination of the optical flow.

Figure 2:
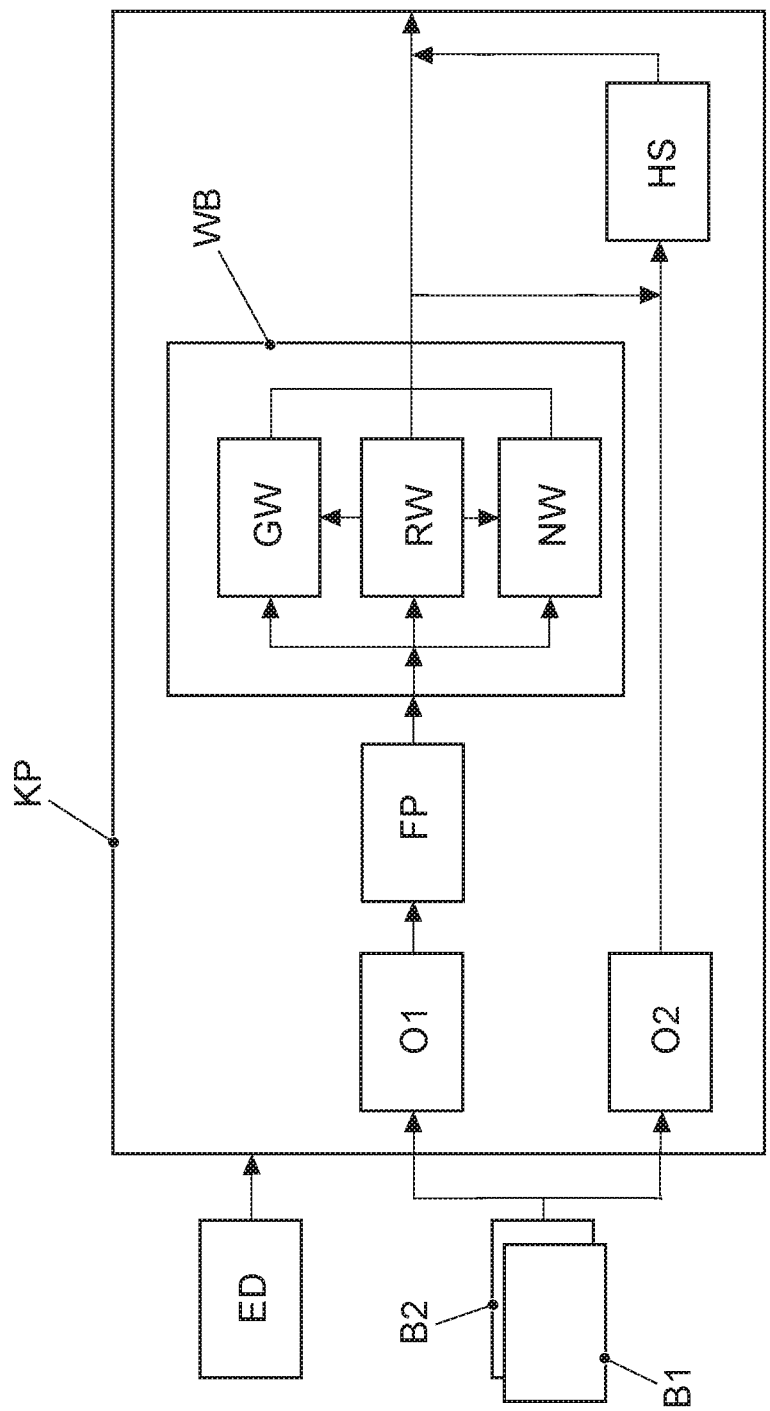
FIG. 2 shows a layout of a calibration system in a schematic representation.

FIG. 2 is a schematic representation of calibration system KP for determining the aforementioned calibration parameters of the camera of a motor vehicle, a brief overview of the components of calibration system KP being first provided, followed by a detailed explanation of the individual components. The calibration system KP can be, for example, an electronic control unit, an onboard vehicle computer, etc.

Input variables of calibration system KP are the recorded camera images B1 and B2 as well as egodata ED of the vehicle. Egodata of the vehicle is understood to mean general vehicle data, such as speedometer values, steering angle, odometry data and position data as well as data on acceleration, yaw angle and pitch rates. This list is not to be viewed as complete. The egodata may support the calibration system, for example to identify vehicle states which are particularly favorable for the calibration operation.

The calibration of the vehicle camera with the aid of calibration system KP is based on the determination of the optical flow within the images of the camera. For this purpose, movement vectors over the image are determined with the aid of features of camera images B1, B2 in first optical flow module O1 of calibration system KP, the movement vectors being determined on the basis of a grid disposed uniformly over the first image.

Based on the movement vectors ascertained in first optical flow module O1, an estimate of the vanishing point is made in vanishing point module FP on the basis of geometric properties. The vanishing point estimate of vanishing point module FP is used in a subsequent angle determination module WB for determining the three rotation angles, angle determination module WB having the interconnected modules yaw angle determination GW, roll angle determination RW and pitch angle determination NW.

Movement vectors of a highly simplified optical flow are determined separately in a second optical flow module O2 in a top view of an image section of the road in front of the vehicle. The height of the camera above the road may be estimated in height estimation module HS from the ascertained movement vectors of the road features as well as egodata and ascertained pitch angle θ.

The details of the individual components are explained in greater detail below

First Optical Flow:

First optical flow O1 is determined in each case between two images B1, B2 of the camera. No dense flow field is determined but rather a regular grid is placed over first image B1. With the aid of the known Lucas-Kanade method, for example, correspondences with the grid are searched for in second image B2. The distances between the grid points may be parameterized, whereby the calculation of the optical flow is highly scalable. In other words, the shorter the distance between the grid points, the greater the runtime of the calculation, while the accuracy of the vanishing point estimate based thereon increases.

Another advantage of the grid approach over a feature-based flow determination is that prominent features are usually found on the contours of moving objects, and these externally moved objects then distort the vanishing point.

Vanishing Point Estimate:

The fundamental matrix of the epipolar geometry is calculated on the basis of the optical flow. It supplies the particular epipole in both examined images B1, B2. In a straight driving trajectory, the two epipoles should be very close together, the distance between them being parameterizable. The mean value of the two epipoles is formed, which forms the instantaneous vanishing point and is forwarded to the pitch and yaw angle estimate.

The following conditions apply to the "very close together" distance between the two epipoles for the pitch and yaw angle determination:

minimum X distance of the pixels relative to the image width=0;

maximum X distance of the pixels relative to the image width=approximately 0.02;

minimum Y distance of the pixels relative to the image height=0; and maximum Y distance of the pixels relative to the image height=approximately 0.01.

If the distance of the epipoles is greater than the aforementioned maximum distances, the determination of the mean values of pitch and yaw angles is much more difficult or even impossible, and greater outliers should be taken into account.

If the vehicle is in a turn maneuver, the two epipoles of images B1, B2 should be situated farther apart. If this condition is met, the two epipoles are forwarded to roll angle estimate RW.

To determine the roll angle, the distances between the epipoles should meet the following conditions:

minimum X distance of the pixels relative to the image width=approximately 0.02;

maximum X distance of the pixels relative to the image width=approximately 0.1;

minimum Y distance of the pixels relative to the image height=0.01; and maximum Y distance of the pixels relative to the image height=approximately 0.05.

This procedure may be carried out with much less runtime and in fewer steps, compared to known methods.

Angle Determination:

Determine of Pitch Angle and Yaw Angle.

The vanishing points determined in the vanishing point estimate are collected over time, old vanishing points being discarded. The quantity and expiration time may be parameterized. If enough vanishing points are present, a time-stable vanishing point is estimated from the quantity of highly dynamic vanishing points, for example using the known RANSAC algorithm. This time-stable vanishing point is used to determine pitch angle $\theta$ and yaw angle $\psi$ in corresponding modules NW, GW.

Roll Angle Estimate

The epipoles collected in the turn maneuver are used directly to determine a possible roll angle by means of their position in the image. This highly dynamic roll angle is collected over time and divided into groups, the expiration time, quantity and groups being parameterizable. Four groups can preferably be used, namely: high yaw rate to the left; mean yaw rate to the left; high yaw rate to the right; and mean yaw rate to the right.

The ranges of yaw rate $\alpha$ indicated below have proven to be successful for defining the four groups mentioned above:

Range for slow turn maneuvers to the left: 0°/s<=$\alpha$<8°/s (mean yaw rate, left);

Range for fast turn maneuvers to the left: 8°/s<=$\alpha$<45°/s (high yaw rate, left);

Range for slow turn maneuvers to the right: 0°/s>=$\alpha$>−8°/s (mean yaw rate, right);

Range for fast turn maneuvers to the right: −8°/s>=$\alpha$>−45°/s (high yaw rate, right).

At least a minimum number of measurements should be present in each group. If this is the case, the mean value is calculated for each group and the average subsequently formed once again with the aid of these four mean values. This average is used to determine roll angle RW.

Height Estimate

A highly simplified optical flow is determined in the standard implementation. In the first step, a top view from an image section directly in front of the vehicle is calculated, the image section being parameterizable. A rectangle is placed within this section in the first image, which is located again in the second image with the aid of block matching, taking into account the parameters of the height and width of the rectangle. The movement of the rectangle forms the optical flow.

In the standard implementation, the following basic conditions apply to the rectangle, which is referred to as the template box:

Template box width relative to top view width=approximately 0.9

Template box width relative to template box width=approximately 0.4

In the top view image of the first frame, the template box is positioned in such a way that the upper edge of the template box is situated in the center at the upper edge of the image, i.e., approximately 5% of the edge remains on the left and right compared to the top view width.

Height Determination

The movement of the rectangle in the image ascertained in the first step is converted directly into a real movement of the vehicle, the value, however, being heavily underlaid by noise. Therefore, a histogram is set up over time, using the parameters of the lowest and highest values of the histogram as well as the number of bins. Once again, the measurements may expire with age. If a minimum number of measurements is present in the histogram, N number of adjacent bins containing the most measurements is searched for. The median of these bins is subsequently formed. The result is then the estimated height.

Figure 3:
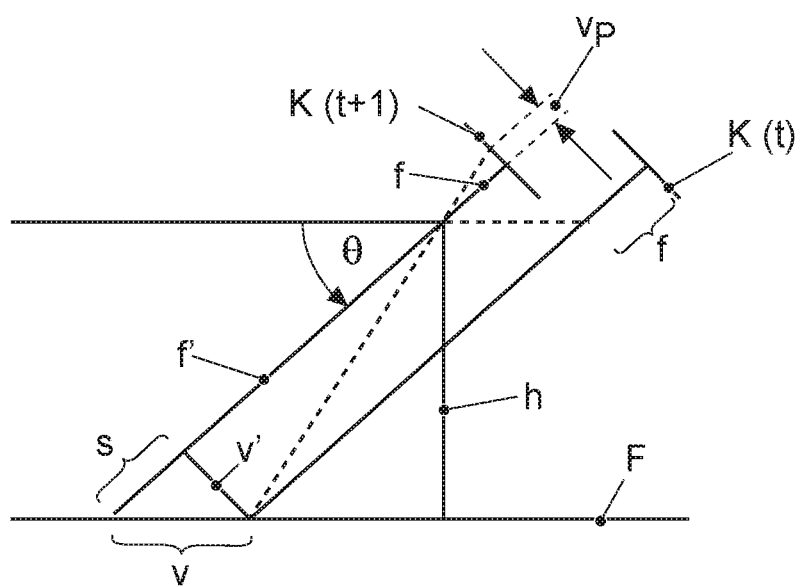
FIG. 3 shows a schematic representation of a height estimate.

The principle procedure for determining the height is explained on the basis of FIG. 3, a simple pinhole camera model being used as the basis for FIG. 3, and the height determination being discussed here based on the movement of the median pixel. If the vehicle (not illustrated) moves in a straight trajectory, at a known instantaneous velocity v, and if pitch angle $\theta$ of the camera is known, camera height h relative to road F may be determined with the aid of the optical flow. The optical flow supplies velocity $v_P$, at which the pixel in the center of the image of the camera moves. FIG. 3 shows the geometry for determining camera height h and represents two different points in time t and t+1, at which the projected image middle point is examined in schematically illustrated camera image planes k(t) and K(t+1) at points in time t and t+1, the camera having focal length f. The values for traveled distance v, pitch angle $\theta$ of the camera, focal length f of the camera and velocity $v_P$ of the median pixel in the image are known. From the evident relationship:

$$\frac{V'}{f'} = \frac{v_P}{f}$$

height h may be determined from the known variables by applying simple trigonometry:

$$h = \sin\theta\left(\frac{fv\sin\theta}{v_P} + \cos\theta\right)$$

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for calibrating a camera system of a motor vehicle, the calibration parameters comprising a rotation angle, a pitch angle, a yaw angle, a roll angle, and a height of a camera above a road, the method comprising:
determining the rotation angle from an ascertainment of a vanishing point from a first optical flow between a first and a second camera image;
determining the height of the camera from a second optical flow between a first and a second camera image;
placing a regular grid over the first camera image;
searching for correspondences of the regular grid in the second camera image; and
determining the first optical flow from a movement of the regular grid over the first and second camera images,
wherein epipoles in both camera images are calculated based on the ascertained first optical flow, and wherein the epipoles are used to estimate the vanishing point.

2. The method according to claim 1, wherein distances between the grid points are parameterizable.

3. The method according to claim 1, wherein, to determine the pitch angle and the yaw angle, the vanishing point is determined from the two epipoles of the two camera images when a distance between the epipoles is situated within a first predefined interval.

4. The method according to claim 3, wherein the ascertained vanishing points are stored for a predefined time interval, and wherein a time-stable vanishing point is ascertained from the quantity of the ascertained vanishing points for determining the pitch angle and the yaw angle.

5. The method according to claim 1, wherein the two epipoles of two camera images are used to determine the roll angle when the distance between the epipoles is situated within a second, predefined interval, and wherein the roll angle is estimated from a position of the epipoles in the particular camera image.

6. The method according to claim 5, wherein the ascertained roll angles are collected over time and divided into predefined groups as a function of the yaw rate of the motor vehicle.

7. The method according to claim 6, wherein a mean group roll angle is formed for each group of stored roll angles when the number of measurements in each group reaches a minimum quantity, the final roll angle being formed from the mean group roll angles of the groups.

8. A method for calibrating a camera system of a motor vehicle, the calibration parameters comprising a rotation angle, a pitch angle, a yaw angle, a roll angle, and a height of a camera above a road, the method comprising:
determining the rotation angle from an ascertainment of a vanishing point from a first optical flow between a first and a second camera image;
determining the height of the camera from a second optical flow between a first and a second camera image;
placing a regular grid over the first camera image;
searching for correspondences of the regular grid in the second camera image; and
determining the first optical flow from a movement of the regular grid over the first and second camera images,
wherein, to determine the second optical flow in a section of a first image of the road, a rectangle ascertained in the second image is placed in front of the vehicle in a top view, wherein the second optical flow is formed by a movement of the rectangle in the two images, and wherein the height of the camera is calculated from the movement of the rectangle.

9. The method according to claim 8, wherein a time histogram of the measured heights of the camera is generated for a large number of first and second camera images, and wherein a height estimate is derived from the histogram upon reaching a minimum number of measurements.

10. An apparatus for calibrating a camera system of a motor vehicle with calibration parameters comprising a rotation angle, a pitch angle, a yaw angle, a roll angle and a height of a camera above a road, the apparatus comprising:
a module for determining a first optical flow between a first and a second successive camera image;
a module for determining vanishing points from the first optical flow;
a module for determining the rotation angle from the ascertained vanishing points;
a module for determining a second optical flow between a first and a second successive camera image; and
a module for determining the height of the camera from a second optical flow,
wherein, to determine the first optical flow, a regular grid is placed over the first camera image, correspondences of the regular grid are searched for in the second camera image, and the first optical flow is determined from the movement of the grid over the camera images, and
wherein the module for determining the vanishing point calculates epipoles in the two camera images on the basis of the ascertained first optical flow and uses the epipoles to estimate the vanishing point.

11. An apparatus for calibrating a camera system of a motor vehicle with calibration parameters comprising a rotation angle, a pitch angle, a yaw angle, a roll angle and a height of a camera above a road, the apparatus comprising:
a module for determining a first optical flow between a first and a second successive camera image;
a module for determining vanishing points from the first optical flow;
a module for determining the rotation angle from the ascertained vanishing points;
a module for determining a second optical flow between a first and a second successive camera image; and
a module for determining the height of the camera from a second optical flow,
wherein, to determine the first optical flow, a regular grid is placed over the first camera image, correspondences of the regular grid are searched for in the second camera image, and the first optical flow is determined from the movement of the grid over the camera images, and
wherein to determine the second optical flow in a section of a first image of the road, a rectangle ascertained in the second image is placed in front of the vehicle in a top view, the second optical flow being formed by the movement of the rectangle in the two images, and the height of the camera being calculated from the movement of the rectangle.

12. The apparatus as according to claim 11, wherein the module for determining the camera height generates a time histogram of the ascertained heights of the camera for a large number of first and second camera images and derives a height estimate from the histogram upon reaching a minimum number of measurements.

* * * * *